(12) United States Patent
Ciabattoni

(10) Patent No.: US 8,229,833 B2
(45) Date of Patent: Jul. 24, 2012

(54) SIMPLIFIED QUOTE SHARING CALCULATION

(75) Inventor: William Ciabattoni, Valley Stream, NY (US)

(73) Assignee: International Securities Exchange, LLC, New York, NY (US)

( * ) Notice: Subject to any disclaimer, the term of this patent is extended or adjusted under 35 U.S.C. 154(b) by 1334 days.

(21) Appl. No.: 11/904,670

(22) Filed: Sep. 28, 2007

(65) Prior Publication Data
US 2009/0089220 A1 Apr. 2, 2009

(51) Int. Cl.
*G06Q 40/00* (2006.01)
(52) U.S. Cl. ............. 705/37; 705/1.1; 705/26.1; 705/45
(58) Field of Classification Search .............. 705/35–45
See application file for complete search history.

(56) References Cited

U.S. PATENT DOCUMENTS

| | | | |
|---|---|---|---|
| 7,603,290 B1 * | 10/2009 | Tenorio | 705/26.1 |
| 7,689,495 B1 * | 3/2010 | Kim et al. | 705/37 |
| 7,818,246 B2 * | 10/2010 | Cushing et al. | 705/37 |
| 7,860,796 B2 * | 12/2010 | Levy | 705/45 |
| 7,925,570 B2 * | 4/2011 | Hatheway et al. | 705/37 |
| 2002/0178108 A1 * | 11/2002 | Tresser et al. | 705/37 |
| 2002/0184136 A1 * | 12/2002 | Cleary Neubert et al. | 705/37 |
| 2004/0019553 A1 * | 1/2004 | Setz et al. | 705/37 |
| 2008/0172318 A1 * | 7/2008 | Bartko et al. | 705/37 |
| 2008/0228623 A1 * | 9/2008 | Adcock et al. | 705/37 |
| 2010/0191640 A1 * | 7/2010 | Tilly et al. | 705/37 |
| 2010/0332374 A1 * | 12/2010 | Adcock et al. | 705/37 |
| 2010/0332379 A1 * | 12/2010 | Ram et al. | 705/37 |

FOREIGN PATENT DOCUMENTS

WO WO2009021242 * 2/2009

OTHER PUBLICATIONS

J. Scott Chaput, Louis H. Ederington; Option Spread and combination trading, Summer 2003, Journal of Derivatives, 10, 4, 70(19).*
CTA/UTP Revenue Allocation Functional Requirements Specification; Version 3.1; Greenhouse and Williams; Nov. 2006.
Securities and Exchange Commission; 17 CFR Parts 200, 201, 230, 240, 242, 249, and 270; [Release No. 34-51808; File No. S7-10-04]; RIN 3235-AJ18.

* cited by examiner

*Primary Examiner* — Robert Niquette
(74) *Attorney, Agent, or Firm* — Frommer Lawrence & Haug LLP

(57) ABSTRACT

Presented is a method for calculating and distributing quoting share revenue to exchange members that contribute quote data to market data feeds. First, the method reads in trading data chronologically for a particular day. Using an object oriented framework, the method divides the symbols and orders into groups of objects to facilitate the tracking of the total price, quantity, and seconds displayed for each symbol. The timestamp of each message is read and the seconds field is parsed ignoring fractional seconds. Credits are awarded for each second the quote is displayed at the National Best Bid/Offer ("NBBO") by multiplying the price, quantity, and elapsed whole seconds. These quote credits are stored by the system for each member and symbol. Members are eligible to earn quote credits on either the bid or the offer or both at the same time.

2 Claims, 3 Drawing Sheets

Symbol Object for IBM

Symbol Object for MSFT

SIMPLIFIED QUOTE SHARING CALCULATION

FIELD OF INVENTION

The present invention relates to computer applications for financial data processing. More particularly, this invention relates to an automated method of tracking and attributing member quoting activity for the purpose of equitably and efficiently distributing quote share revenue among market participants.

BACKGROUND

Currently, there are three networks responsible for generating and disseminating consolidated market data to the public under the joint self regulated organizations ("SRO") plans and the Exchange Act Rules. The three networks are the NYSE, AMEX, and NASDAQ ("the networks"). The networks collect revenues from public subscribers to their market data feeds. The networks are required by the network plans and the Securities and Exchange Commission ("SEC") to redistribute the subscriber revenue to any SRO that contributed quote and trade data to these market data feeds after deducting certain costs including the cost of administrating the redistribution. The existing revenue distribution formulas among SROs are based solely on trading activity of each SRO. Currently, revenue is not distributed based on quotes. However, when the SEC implements Regulation NMS ("Reg NMS") the existing formulas will no longer be used.

Under Reg NMS, the plan formulas will be modified to include three new components: Security Income Allocation, Trading Share, and Quoting Share. The Security Income allocation component involves the appropriation and aggregation of revenue across all symbols for each SRO based on the square root of the dollar volume of all trades occurring during the year. The revenues for each symbol will then be split between Trading Share and Quoting Share. The Trading share portion will be 50% of the revenue in a specific security. The Quoting share will account for the other 50% of the revenue.

The formula, adopted by Reg NMS, for allocating quote share is the dollar amount determined by multiplying the quote share of the security income allocation for the specified symbol by the SRO's quote rating in a given security. An SRO's quote rating is determined by dividing the number of quote credits earned by the SRO by the total number of quote credits earned in the symbol by all SROs. Reg NMS states that an SRO is entitled to a quote credit (QC) only when a price is displayed at the National Best Bid Offer ("NBBO") for at least one full second. The QC formula derived by Reg NMS is the following:

$$QC = \text{\# of seconds price shows at } NBBO \times \text{quantity} \times \text{price}$$

One method for allocating subscriber revenue among the SROs under Reg NMS was developed by the Tee Williams Group. This method is designed to assign Quote Credits accurately when quotes are being posted and removed on the scale of milliseconds compared with the one-second interval specified by Reg NMS. This method was also developed to overcome distortion of the true NBBO by participants that enter "flickering quotes," that is, quotes that are posted for short intervals. Such flickering quotes have the effect of preventing other participants from being at the NBBO for a full second but do not contribute to price discovery. The Tee Williams method was also designed to deal with the fact that the quantity of quotes is constantly fluctuating on each of the network exchanges. The Tee Williams method overcomes these problems using a complex algorithm, which is described in Greenbaum, Lee and Williams, R. Tee; CTA/UTP Revenue Allocation Functional Requirement Specification, Nov. 16, 2006, Ver. 3.1.

The Tee Williams method is used by the Networks to distribute subscriber revenue among SROs. It is impractical for individual SROs to use this method to distribute that revenue among individual market participants. Because of the enormous amount of data required to perform the Tee Williams calculation and the complexity of the algorithm, it would require a large team of developers and testers to implement a similar system at the level of an individual exchange. Moreover, there is no guarantee that the resulting calculation would accurately track the same distribution within an individual exchange as the Tee Williams method does among SROs because of timing differences between market data feeds.

The Tee Williams method allocates market data revenue among a relatively small number of SROs. There is a need for a system where SROs can distribute the market data revenue they receive from the networks to their own members who place quotations and orders on their markets. By providing this revenue to their members, an SRO can incentivize those members to place more and larger orders on their markets. Distributing market data revenue also gives an SRO a competitive advantage over other SROs that do not distribute this revenue. But allocating market data revenue using the Tee Williams method presents a problem for SROs. The Tee Williams method is computationally intensive and requires dedicated resources and personnel to administer and maintain the necessary hardware and software. It is workable where total amount of revenue to distribute is relatively large compared with the costs to operate the system. What is required is a method and system to calculate member Quote Credits that remains true to the formula required under Reg NMS, that minimizes the impact of flickering quotes and rapid changes in quotation size that is simpler to code and maintain, more easily implemented and computationally more efficient than prior art methods.

SUMMARY OF INVENTION

The present invention is directed to a method and system for allocating market data revenue among a plurality of entities that provide market quotes. It is an object of the invention to provide a method and system wherein market data revenue is allocated only on the basis of quotes that provide price discovery and wherein "flickering quotes" are not used to allocate that revenue. In is a further object of the invention to equitably and efficiently allocate quote revenue among market participants in a manner that approximates revenue allocation by the Networks. It is a further object of the invention to provide a quote revenue allocation method and system that fairly allocates market data revenue at lower cost and in a more computationally efficient manner than prior art methods. It is a further object of the invention to provide an efficient method of tracking and attributing quote credits to all members of an SRO responsible for the SRO earning quote revenues from the Networks while avoiding the cost and complexity to build and maintain a system using prior art methods.

According to an aspect of the invention, the system first divides a day's worth of trading activity into intervals considered to be sufficient to provide price discovery, for example, one second intervals. A shorter or longer time interval could be selected provided the interval is sufficient to reject quotes too short-lived to fairly contribute to price discovery. By dividing the data into such intervals the system effectively removes the impact of flickering quotations and fluctuating quote quantities from the equation. Any quotes that are adjusted or "flicker" for periods less than this interval will be ignored by the calculation and any quantity adjustments caused by either a quote modification or an execution that occurs during the interval will also be ignored by the system. The system then compares the price and current quantity of the quotes provided by market participants at each interval to the NBBO. If the quote was equal to the NBBO and was displayed for one full second or more, then the QC is calculated and the quote credit will be assigned for that interval. If the quote is displayed for several intervals it will be eligible to earn credits at each interval.

DETAILED DESCRIPTION

Figure 1:
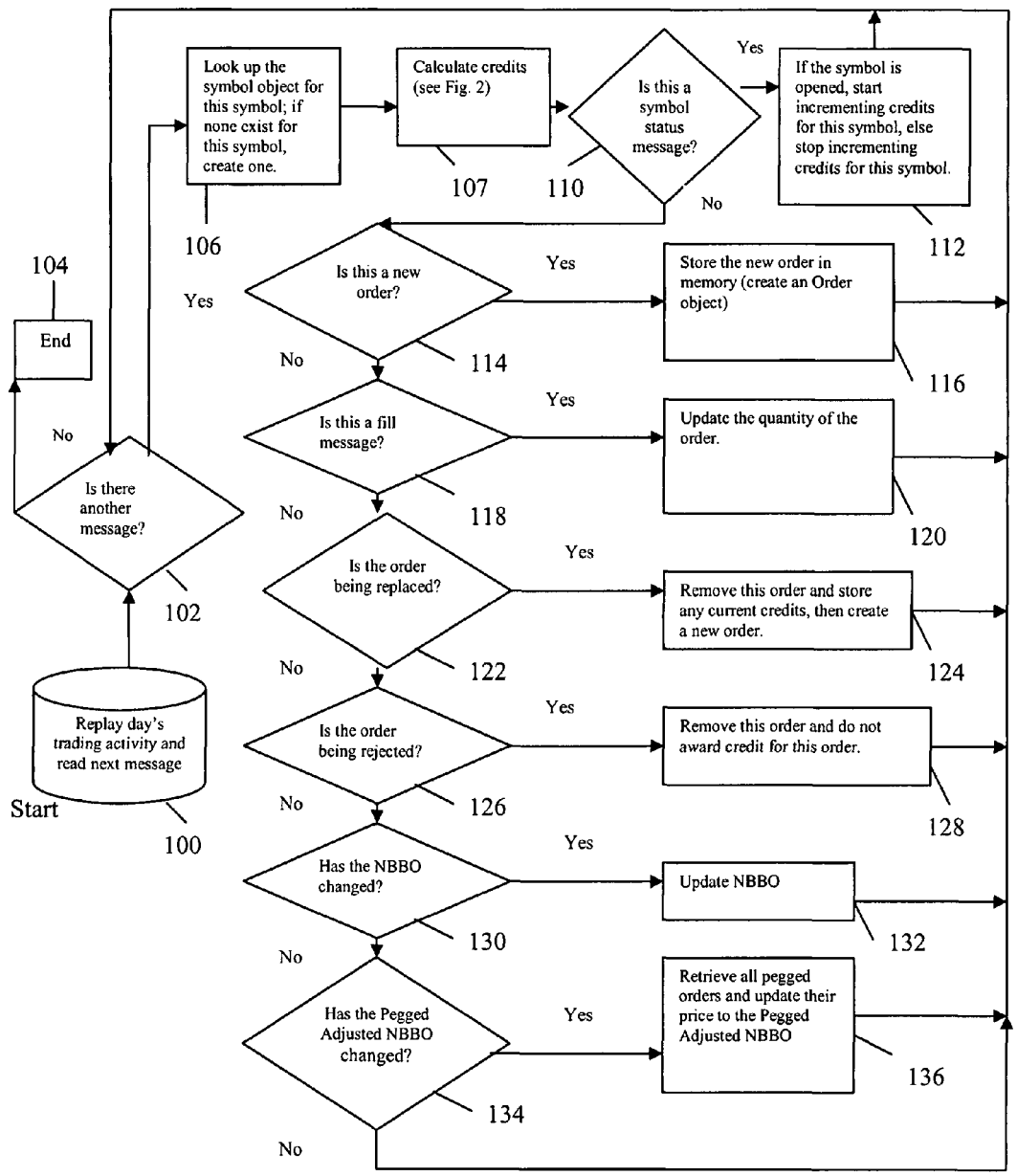
FIG. 1 is a main algorithmic loop, executable on a computer, for processing market data and keeping track of quote credits according to an embodiment of the present invention.

In a preferred embodiment, the invention is implemented in the C# programming language using object-oriented programming techniques, but can be encoded in any other object-oriented programming language, or non-object oriented programming language as will be appreciated by a person of ordinary skill in the field of the invention. According to one embodiment of the invention, market data is stored in a Market Data Repository ("MDR"). An MDR stores market data and re-plays data messages chronologically. Data may be stored and processed on a daily basis, for example, after the close of a trading day. Alternatively, data may be collected over some other period of time and processed or else processed continuously as data messages are generated.

According to one embodiment of the invention, MDR data is accessed via a plug-in, which is a block of code contained within a library file that subscribes to the MDR. In a preferred embodiment, data is read from an MDR, but the invention is not limited to MDR data. Any other source of market data could be used, such as a database. If an embodiment uses a database, then software with embedded database calls can be used to retrieve market data.

According to a preferred embodiment of the invention, the system defines an object class called "Symbol Processor." A Symbol Processor object is created for each symbol in the current order book. The symbol corresponds to a particular financial instrument, for example, a stock, an option contract, a currency, or the like. By way of illustration, the preferred embodiments of the invention are described in terms of a particular stock, for example, shares of IBM.

The Symbol Processor uses two hash tables, which include one table for bid orders and one table for ask orders for that symbol. The tables are hashed by price. The Symbol Processor also contains the following variables:
1. A variable containing the current National Best Bid and Offer (NBBO) and another for last NBBO for the symbol.
2. A variable to hold the last trade price for the symbol.
3. A variable to hold the last message time for the symbol.
4. A variable containing a list of completed orders that have accrued credits waiting to be written to an output file.
5. Boolean value stating whether the symbol is open to calculating credits.

Once the Symbol Processor objects are allocated and initiated for each symbol, processing is ready to begin. In a preferred embodiment, the plug-in only subscribes to certain transactions. The transactions are the following:
1. Order Status: This message contains the status of the order.
2. National BBO: Contains all information regarding the state of the NBBO.
3. External Trade: Contains data on the last sale of the stock.
4. Symbol Status: Contains market state messages.

Upon receipt of a message, the system according to the preferred embodiment checks to see if it is one of the above listed message types and it also checks the symbol. Another hash table is indexed by symbol, which maps the symbol to the appropriate Symbol Processor object. The Symbol Processor object contains five public functions, which are described below:

Process Symbol Status

This function is used by a Symbol Processor object to set the Boolean value "isOpen" to true or false depending on the symbol status. Credits will not increment unless this value is set to true. The "isOpen" value is set to false by default and only changes to true when an "Open" symbol status message is received. Once open, the symbol will accumulate credits until an "Ops Halted", "Market Halted", or a "Closed" message is received. No further credits will be awarded until the symbol is re-opened. The timer for adding credits will reset to zero when the symbol is re-opened.

Process National Best Bid Offer

This function sets the last NBBO value to the current NBBO value and current NBBO value is then set to the latest value. The Symbol Processor object keeps track of both the most recent and previous NBBO in order to add credits based on elapsed time between received messages. This will be discussed in the section "Adding Credits."

Process Order Status

This function processes all order status messages including New, Replaced, Admin Canceled, System Cancelled, User Cancelled, Filled, Partial Filled, Rejected, Shares Locked and Shares Unlocked. When an Order Status message is passed to a Symbol Processor object, an instance of the Order class is created and processed according to the status it contains. Two hash tables in the Symbol Processor object, "current bid orders" and "current ask orders", store active orders by price and order number. An order can be added, deleted, updated, moved to a new price, and credited while stored in one of the tables. When an order is completely filled, cancelled, or the symbol is closed, it will be removed from the active orders table; if the order earned credits, the credits will be added to a list of output strings, which will be stored after processing is complete. The detailed handling of each status is listed below:

New: The Symbol Processor first checks to see if the order should be added to the current bid orders or current ask orders hash tables indexed by order price. If the order's price does not yet exist on the hash table, it will be added with an instance of the custom class Orders as the value of the hash table. The order will then be added to secondary hash table contained within the Orders class by order number. According to one embodiment double hashing allows the system to locate a particular order for further status updates to the order efficiently. For sell short and pegged orders, the price is calculated before adding the order to either hash table.

Partial Filled Shares Locked, and Shares Unlocked: When an order is added to either the current bid orders or the current ask orders hash table, the Symbol Processor keeps track the price to index for the order. When a Partial Filled, Shares Locked, or Shares Unlocked message is received, the Symbol Processor looks up the order using price as the hash index and updates the quantity on the order.

Filled, Admin Canceled, System Cancelled, User Cancelled: These statuses alert the Symbol Processor to remove a particular order from the bid or ask hash tables and stores credits earned, if any, to a list of output strings that will be written to a file at the end of processing.

Replaced: When this message is received multiple events occur. First the existing order is removed from the current orders table and if credits have accrued for the order then they will be stored in the list of output strings. Then a new order is added at the current order price.

Rejected: When this status is received, the order is removed from the current orders hash table and discarded without storing any credit information.

Process Pegged Adjusted NBBO

This function updates the price for Pegged Orders, whose value is set to the pegged adjusted NBBO. Pegged Orders are limit orders to buy or sell a stated amount of a security at a displayed price set to track the current bid or ask of the NBBO. The tracking of the relevant Consolidated Quote information for Pegged Orders will occur on a real-time basis. A Pegged Order may be designated as a Discretionary Order, which means that it includes an un-displayed price as well as a displayed price. The displayed price of a Pegged Order designated as a Discretionary Order will be used to reflect changes in the NBBO. The discretionary price of a Pegged Order will re-price based on the corresponding change in the displayed price, for example, by calculating a price a fixed offset from the displayed price. If the calculated price for the Pegged Order would exceed its limit price, it will no longer track and will remain displayed at its limit price.

Throughout the life of a Pegged Order, the Symbol Processor keeps track of Pegged Orders using the price as the hash index, and under those prices the Orders class keeps track of the Pegged Orders. After the pegged adjusted NBBO is updated, the processor will look at the list of pegged order prices and call a separate function from the Orders class to return all of the Pegged Orders under that price. Since the Orders class keeps tabs on what orders are pegged, it retrieves each Pegged Order by order number and returns a list of orders to the processor. When the Symbol Processor has retrieved all of the Pegged Orders from the current orders tables, it loops through them, recalculates their prices, and adds them back to the current orders table at the new price. Pegged Order prices are based on the Bid\Ask of the pegged adjusted NBBO plus or minus the offset given on the order.

Adding Credits

Before a Symbol Processor handles a new message corresponding to a particular symbol, it compares the timestamp of the new message with the timestamp of the last message received for that symbol. If the time string has changed (HH: MM:SS), the On Time Change function is called to check if credits have been earned. This method subtracts the old message time from the new message time to calculated elapsed seconds between messages. According to one embodiment, if the difference in the time string is greater than one whole second, credit is calculated for the order. For all messages other than NBBO, the Symbol Processor will take the current NBBO's bid and ask values and add credits to all orders sitting under these prices for a second or more in the current bid orders and current ask orders hash tables. Credits are assigned to a specific order by the following formula:

$$QC = price * qty * elapsed\ seconds$$

In this formula "qty" is calculated by an algorithm that subtracts the quantity of the quote that is locked from the displayed quantity:

```
if displayed qty >0
(    if last shares – locked qty < displayed qty
     last shares – locked qty
     else
     displayed qty – locked qty
)
else
last shares – locked qty
```

Orders continue receiving credits in this manner until the order is cancelled, filled, or the symbol is closed for the day. When one of these final states occurs, the symbol processor will verify that the order has been on the books greater than the configured minimum time (one second default), and if so, the credits will be stored to be written to the output file.

Figure 2:
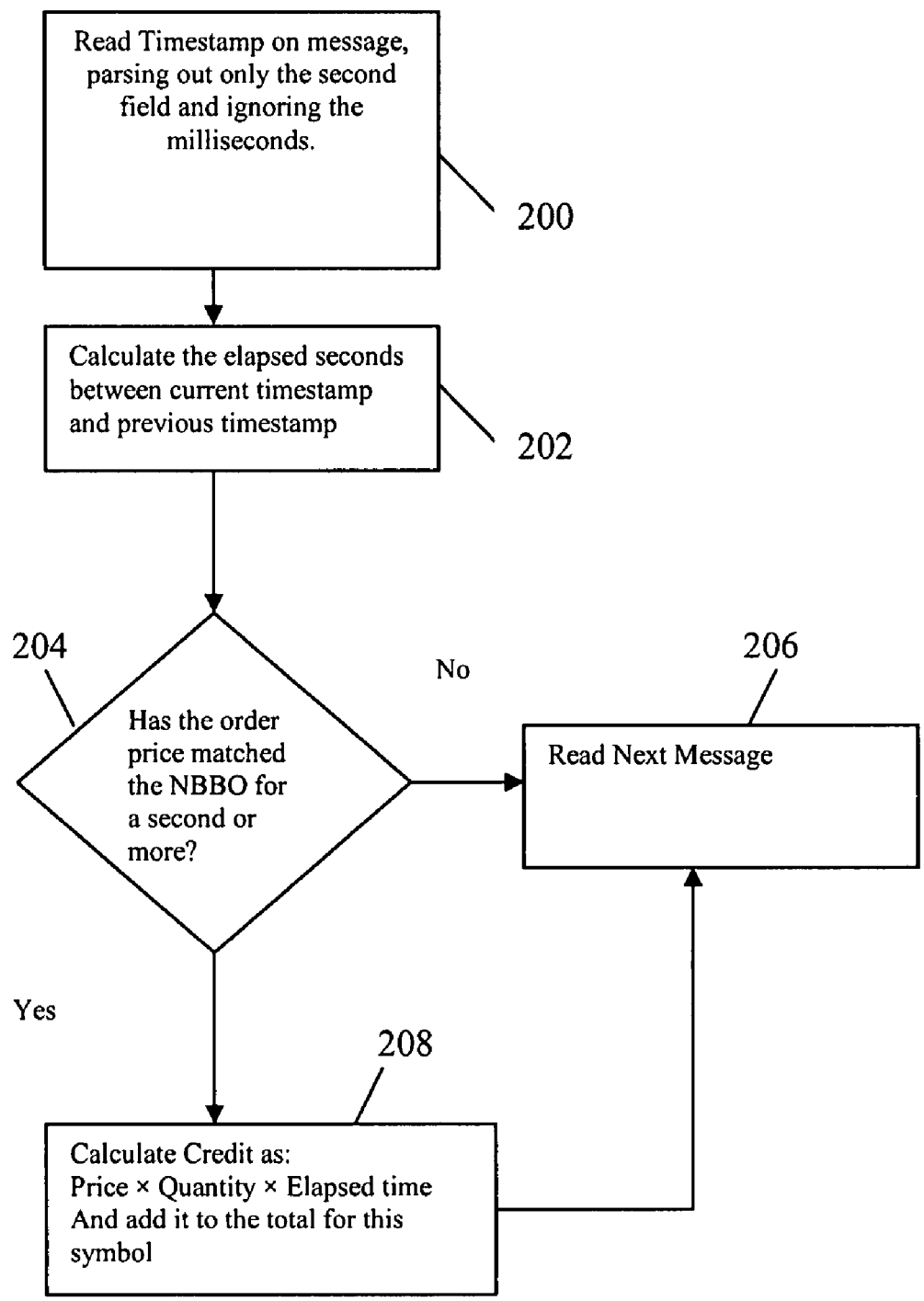
FIG. 2 is an algorithm used for calculating credits according to an embodiment of the present invention.

FIG. 1 illustrates the main processing loop used by a system according to a preferred embodiment of the invention. At step 100 a plug-in to an MDR retrieves a message from a set of stored messages collected over some period of time, for example, a trading day. At step 102 the system determines if there is another stored message. If no more messages are available, the system ends the process at step 104. If a next message is available at step 106 the system looks up the symbol object for this symbol and if none exists, a new symbol object is created. At step 107 the system calculates any revenue data credit that should be applied to the order corresponding to the message. FIG. 2 show an example of how credit may be calculated according to an embodiment of the invention as will be discussed below.

At step 110 the system determines if the message is a symbol status message. If it is a symbol status message, at step 112 the system starts to increment credits for the symbol if the symbol is open and stops incrementing credits if the symbol is closed, for example, because trading in the symbol is halted. Also, if the message is a symbol status message, the system returns to step 102 and looks for the next message.

If at step 110 the system determines that the message is not a symbol status message, at step 114 the system determines if the message indicates this is a new order. If so, an Order object is created at step 116 and processing returns to step 102 to look for a new message. If the message does not indicate a new order, at step 118 the system checks to see if the message indicates that the order has been filled or partially filled. If so, at step 120 the system updates the quantity of the order in the Order object and returns to step 102 to look for a next message. If the message is not a fill message, at step 122 the system determines if the message indicates that the order is being replaced, for example, with an order at a new size or price. If so, at step 124 the system stores any credits that have accrued for the order being replaced and creates a new Order object to hold the new order. If not, at step 126 the system determines if the order is being rejected. If so, at step 128 the Order object holding the order is removed and no credit is awarded to the order.

If the order has not been rejected at step 126, at step 130 the system determines if the NBBO has changed since the previous message was processed. If so, the value for the NBBO in the Order object is updated at step 132 to reflect the new NBBO values. If the NBBO has not changed, at step 134, the system determines whether the pegged adjusted NBBO has changed. If so, at step 136, all Pegged Orders for the symbol are retrieved and their prices are adjusted to reflect the new pegged adjusted NBBO. If at step 134 it is determined that the pegged adjusted NBBO has not changed, the system returns to step 102 and the next message is processed.

FIG. 2 shows how credit for an order is calculated according to an embodiment of the invention at step 107 discussed above. At step 200 the timestamp on the message is read and the seconds field is parsed to determine only the whole second. This value is compared with the previous whole second for the previous message corresponding to the order. At step 202 the elapsed number of whole seconds since the previous message pertaining to the order is determined. At step 204 the system determines if the order has been at the NBBO price for one second or more. If not, no credit is accrued to the order and the system returns to the process shown in FIG. 1 at step 206. If the order has been priced at the NBBO for at least one second, at step 208 the system calculates a market data revenue credit for the order by multiplying the price of the order by the quantity by the time in whole seconds the order has been at the NBBO. That credit is added to any credit that has previously been accumulated for the order. Of course other formulas for determining credit for the order can be used within the scope of the present invention. For example, a weighting function could be used that provides proportionally more credit for larger orders or that provides more credit for the first second the order is at the NBBO and less credit for subsequent second to reward market makers that place marketable quotes for active stocks.

Figure 3A:
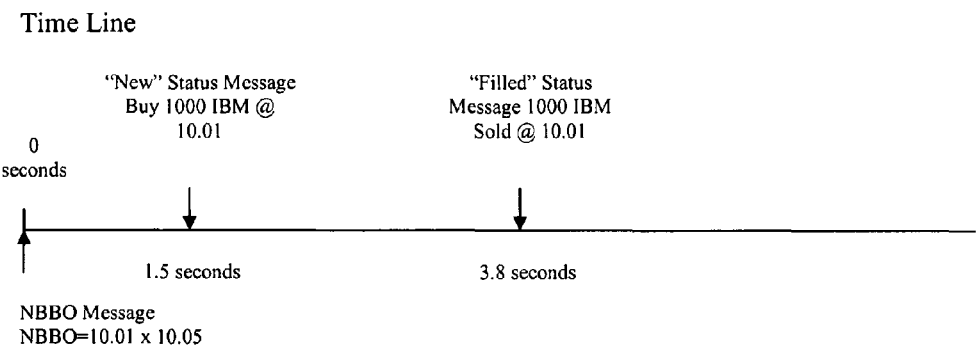
FIGS. 3a and 3b illustrate examples of how a symbol object calculates credits according to an embodiment of the present invention.
Figure 3B:
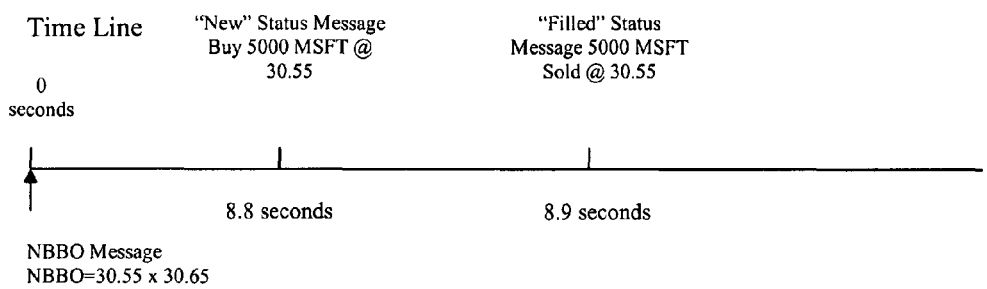

FIGS. 3*a* and 3*b* show timelines where exemplary messages relating to an order for IBM and for Microsoft (MSFT) are processed by the system shown in FIGS. 1 and 2. In FIG. 3*a*, at time 0.00 seconds a National NBBO message with the NBBO for IBM at 10.01×10.05 is received from the MDR. As shown in FIG. 1, at step 106, if no Symbol object for IBM exists, one is created. No credit is calculated at step 108 because an order has not been received and processing passes to step 130 and 132 where the NBBO is updated to reflect 10.01×10.05.

At 1.5 seconds, as shown in FIG. 3*a*, a New status message indicating an order to buy 1000 shares of IBM at 10.01 is received. The system proceeds through steps 102, 106, and 108 in FIG. 1 then to the steps in FIG. 2 where the system determines that this order has not been existent for the minimum one second. At step 110 in FIG. 1 the system determines that this is an order status message and not a symbol status message. At step 114 and 116 an Order object is created for this order.

At 3.8 seconds a Filled status message for this order is received as shown in FIG. 3*a* indicating that the entire 1000 shares were traded. The credit calculation process shown in FIG. 2 is performed at step 108 in FIG. 1. At step 200 in FIG. 2 the timestamp from the Fill message is parsed and the seconds field yields a value of 3. The seconds field from the previous message is parsed to yield a value of 1. At step 202 the elapsed time that the order was at the NBBO is calculated as 2 seconds and at step 204 the system determines that the order has been at the NBBO for that period of time. Credit is calculated in step 209 as 10.01×1000 shares×2 seconds=20,020.

FIG. 3*b* shows another example where a Symbol Object is processed according to an embodiment of the invention. At 0.0 seconds an NBBO message is received indicating that the NBBO for MSFT is 30.55×30.65. As shown in FIG. 1, at step 106, if no Symbol object for MSFT exists, one is created. No credit is calculated at step 108 because an order has not been received and processing passes to step 130 and 132 where the NBBO is updated to reflect 30.55×30.65.

At 8.8 seconds, as shown in FIG. 3*b*, a New status message indicating an order to buy 5000 shares of MSFT at 30.55 is received. The system proceeds through steps 102, 106, and 108 in FIG. 1 then to the steps in FIG. 2 where the system determines that this order has not been existent for the minimum one second. At step 110 in FIG. 1 the system determines that this is an order status message and not a symbol status message. At step 114 and 116 an Order object is created for this order.

At 8.9 seconds a Filled status message for this order is received as shown in FIG. 3*b* indicating that the entire 5000 shares were traded. The credit calculation process shown in FIG. 2 is performed at step 108 in FIG. 1. At step 200 in FIG. 2 the timestamp from the Fill message is parsed and the seconds field yields a value of 8. The seconds field from the previous message is parsed to yield a value of 8. At step 202 the elapsed time that the order was at the NBBO is calculated as 0 seconds and at step 204 the system determines that the order has not been at the NBBO for the minimum one second. No credit is allocated to the order.

The above embodiments are illustrative of the present invention. Also, the terminology used herein is for the purpose of description and not of limitation. It is to be understood that the invention is not intended to be limited by this disclosure or particular arrangements shown, but rather is intended to cover various modifications and equivalent arrangements included within the spirit and scope of the invention, as will be apparent to a person of ordinary skill in the art.

I claim:

1. A method for a Self Regulated Organization to calculate and attribute quote share credits to its members comprising the steps of:
   a. storing on a computer readable medium by a processor executing processing instructions inputted trading data for a trading day, the trading data including a plurality of messages corresponding to at least one displayed order;
   b. dividing the trading day into one-second intervals by the processor executing processing instructions;
   c. retrieving from the computer readable medium the trading data by the processor executing processing instructions;
   d. determining from the plurality of messages that the displayed order was displayed and available to trade for one full second or more at a beginning of one or more one-second interval by the processor executing processing instructions, wherein a price of said displayed order is equal to the price of the NBBO, and wherein said order does not lock or cross a market;
   e. calculating quote credits of said determined displayed order by multiplying the price times the quantity of said displayed order at each interval by the processor executing processing instructions; and
   f. storing said quote credits by date, member, and symbol on the computer readable medium by the processor executing processing instructions.

2. A computerized system for attributing quote share credits for a Self Regulated Organization comprising:
   a first memory;
   input trading data for a trading day stored in the first memory, wherein the input trading data includes a plurality of messages corresponding to at least one displayed order;

a processor connected to the first memory;

a first algorithm operable by the processor for dividing, trading day into one-second intervals and for determining that the displayed order was displayed and available to trade for one full second or more at a beginning of one or more of the one-second intervals at a price equal to an NBBO price and that the displayed order does not cross or lock a market; and, a second algorithm operable by the processor for calculating quote credits for the identified displayed order by multiplying the price times the quantity of the order at each one-second interval and for storing the calculated quote credits in the first memory.

* * * * *